July 3, 1956

E. G. BENTLEY 2,753,016

ESCAPEMENT TYPE INCREMENTAL MOTOR

Filed Nov. 9, 1954

INVENTOR:
Ephraim G. Bentley
By Hubert E. Metcalf
His Patent Attorney

July 3, 1956  E. G. BENTLEY  2,753,016
ESCAPEMENT TYPE INCREMENTAL MOTOR
Filed Nov. 9, 1954  2 Sheets-Sheet 2
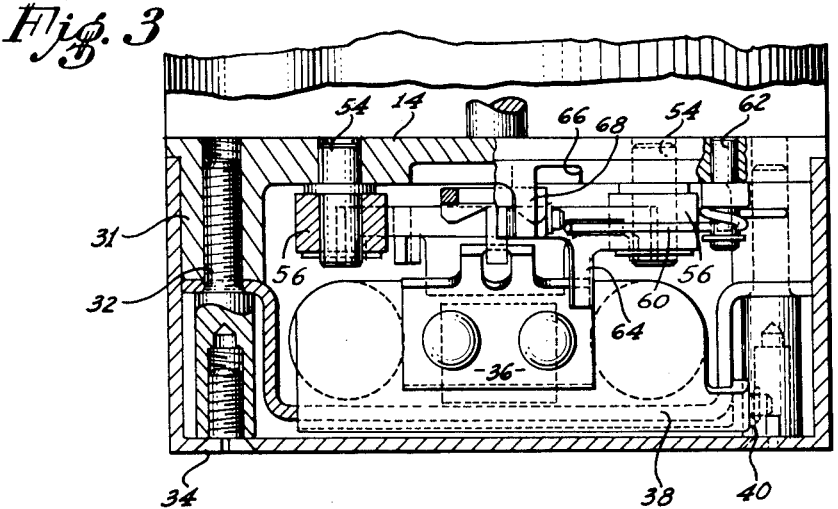
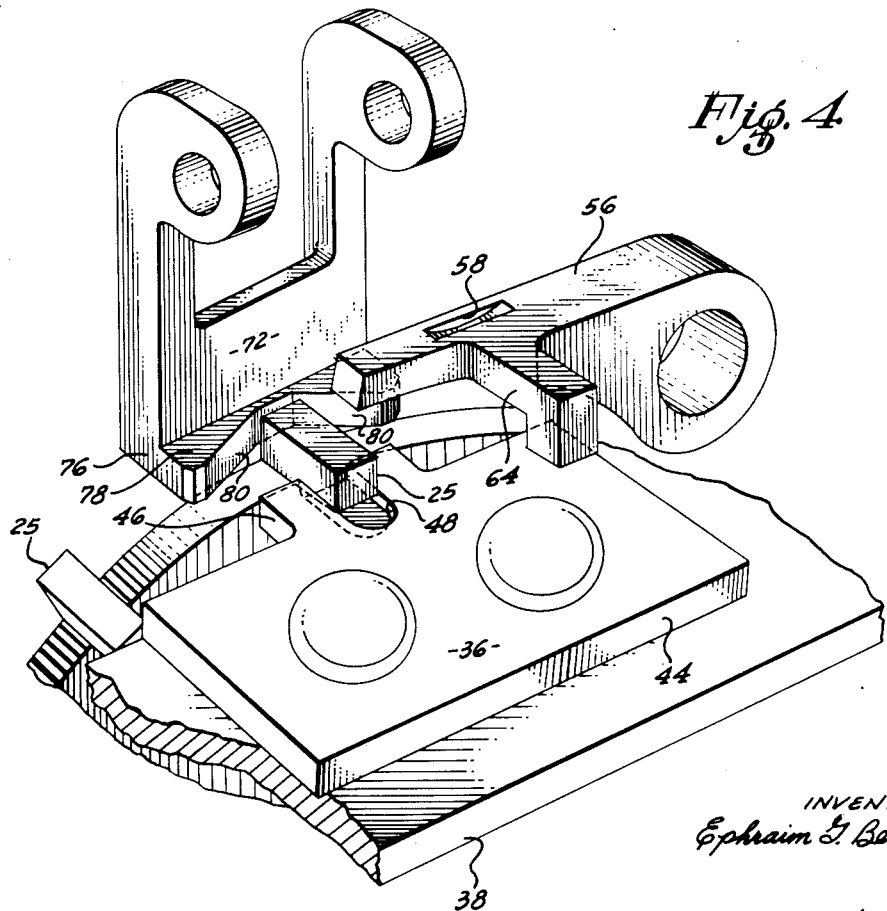
INVENTOR:
Ephraim G. Bentley
By Hubert E. Metcalf
His Patent Attorney

United States Patent Office 2,753,016
Patented July 3, 1956

2,753,016

ESCAPEMENT TYPE INCREMENTAL MOTOR

Ephraim G. Bentley, El Segundo, Calif., assignor to Northrop Aircraft, Inc., Hawthorne, Calif., a corporation of California Application November 9, 1954, Serial No. 467,721

13 Claims. (Cl. 188—85)

The present invention relates to devices operated by electrical pulses, and more particularly described as an escapement type incremental or stepper motor.

In stepper motors that have a rotative force applied to a shaft, it is necessary to provide structure that will interrupt the rotation in order that a proper signal may be transmitted to remotely located equipment. It is preferred that such stepper motors be capable of rotation in either one of two directions or alternately in first one direction and then the other, depending on the electrical pulses that are transmitted to the motor.

Some stepper motors require structure that rotates a shaft through a limited but accurately defined path of travel, and no signal may be transmitted unless the defined distance of travel is completed.

Stepper motors are used to control accurately functioning mechanisms such as computing devices servo system, electrical relay systems that may be found in communication equipment and similar applicable structures.

Devices of the kind to which this invention relates, should operate on the electrical power provided, be so constructed that they may be readily incorporated in place of other previously used devices in a wide variety of equipment and should be readily adapted to the special needs of whatever type of equipment the device is to be used.

Therefore, the principal object of this invention is to provide an electrical pulse actuated stepper motor which can be operated very accurately for an extended period of time without danger of missing any pulses.

Another object of this invention is to provide an electrical pulse actuated stepper motor capable of use in a variety of equipment, which may be readily actuated in one or the other direction or alternately in one direction and then the other or in any combination thereof.

A yet further object of this invention is to provide electrical pulse actuated structure incorporated in a stepper motor that will effectively lock a shaft, having a rotative force applied thereto, against rotation in order that a proper signal may be transmitted to remotely located equipment, and releasing the shaft for the purpose of subsequently transmitting another signal.

Figure 3 is a fragmentary, cross-sectional view, taken on irregular lines 3—3 in Figure 1 looking in the direction indicated.

Figure 4 is a fragmentary, enlarged view of the structure for locking and unlocking the rotation of a shaft to which a sprocket wheel is secured.

Figure 1:
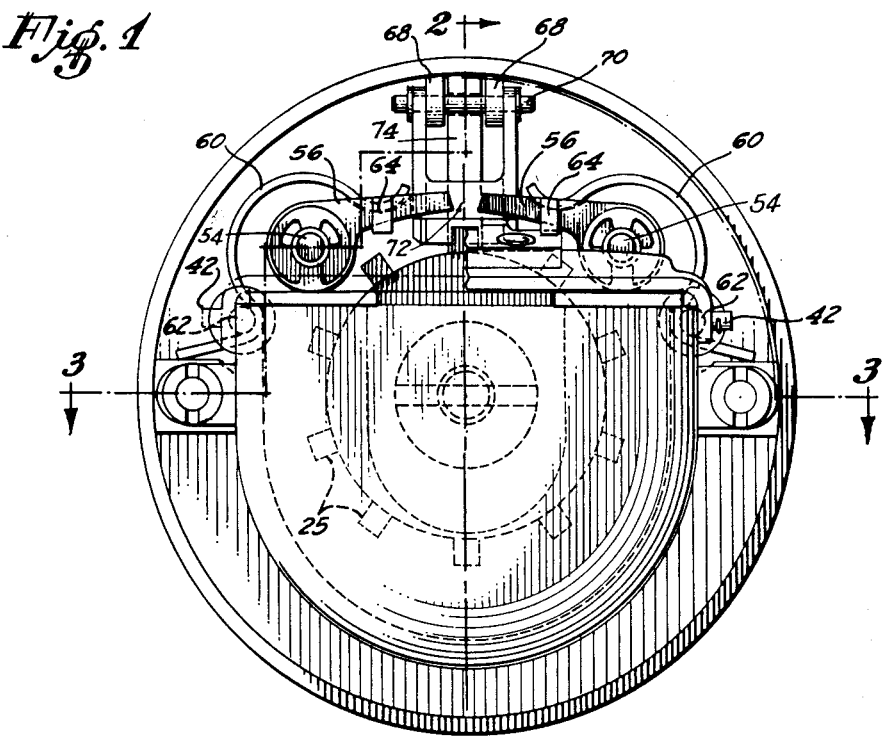
Figure 1 is a fragmentary, cross-sectional view, of the device of this invention, parts being broken away and shown in dotted lines for purposes of clarity.

Referring to the drawings for a detailed description of the preferred embodiment of the present invention 10 broadly designates an electrical motor enclosed within a cylindrical housing 12 having an end cap 14 thereon which is one wall of a compartment 16 enclosed by a cover assembly 18. Extending through housing 12, into compartment 16 and rotated by motor 10 is a shaft 20 which has secured thereto, by a pin 22, a multi-toothed sprocket wheel 24. The sprocket wheel 24 has a plurality of teeth 25 thereon.

Located in compartment 16 is a coil assembly broadly designated by 26 which includes an electrical solenoid coil 28 having thereabout a coil cover 30. As may be determined by referring to Figure 3, the coil cover 30 is secured to bosses 31 on cap 14 by studs 32 and the cover assembly 18 is interconnected to cap 14 by screws 34 being threaded into studs 32.

Figure 2:
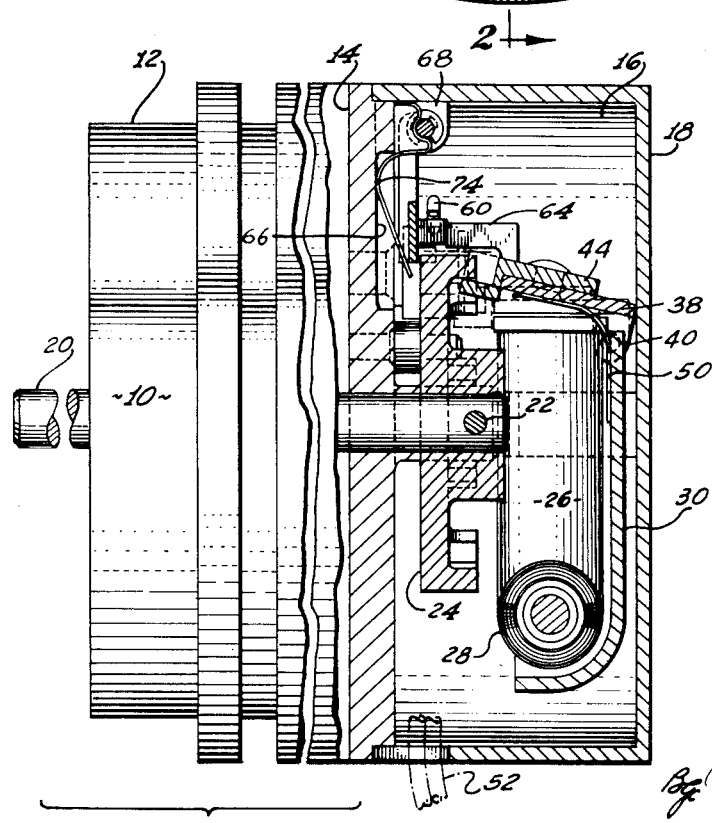
Figure 2 is a fragmentary, cross-sectional view, parts being broken away and shown in dotted lines, taken on lines 2—2 in Figure 1 looking in the direction indicated.

Pivotally secured to coil cover 30 is a clapper type armature assembly broadly designated 36. The armature comprises an elongated plate 38 having an ear 40 at each end thereof through which extends a pivot pin 42 secured to coil cover 30 and about which armature assembly 36 pivots. Riveted or otherwise attached to plate 38 is a second plate 44 having a projection 46 thereon into which is formed a notch 48. Secured to coil cover 30 and bearing against plate 38 is a flat spring 50 which continuously urges the armature assembly into the position shown in full lines in Figure 2 of the drawings.

Extending into compartment 16 for the purpose of energizing coil 28 are electrical leads 52.

Accordingly when motor 10 and coil 28 are simultaneously energized rotation is applied to shaft 20 and sprocket wheel 24 due to the fact that the armature assembly 36 is magnetically drawn to the dotted line position and the notch 48 of the armature assembly is out of engagement with the teeth 25 of the sprocket wheel 24. When the motor 10 and coil 28 are de-energized the spring 50 urges the armature assembly to the full line position illustrated; the notch 48 engages one of the teeth 25 on sprocket wheel 24 which effectively locks the shaft 20 against further rotation until the motor 10 and coil 28 are again energized.

Secured to cap 14 are a pair of spaced apart studs 54 about which are pivotally secured pawls 56 that engage, in opposed relationship to each other, the teeth 25 of the sprocket 24 and prevent the rotation of the shaft 20. Formed in each of the pawls 56 is a groove 58 which receives one end of a spring 60; the other end being partially coiled about another stud 62 and resting on boss 31. Projecting from each pawl 56 is an L-shaped arm 64 that is engaged by plate 44 of the armature assembly 36.

Formed in end cap 14 is a chamber 66 and a pair of spaced projecting ears 68. Extending through ears 68 is a pin 70 to which is pivotally attached a catch 72. Partially embracing pin 70 and bearing against catch 72 in the manner illustrated in Figure 2 of the drawings is a spring 74 that continuously urges catch 72 out of chamber 66 and toward sprocket wheel 24. Catch 72 has as a part thereof a projection 76 which provides a face 78 upon which pawls 56 rest when substantially V-shaped groove 80 has located therewithin one of the teeth 25. A complete cycle of operation will now be described. Assuming electrical motor 10 and solenoid coil 28 to be de-energized. By virtue of these facts the armature assembly 36 will be urged to the position shown in full lines in Figure 2 by spring 50. The shaft 20 and sprocket 22 will be prevented from rotating due to the fact that a tooth 25 on sprocket 24 is engaged in groove 48 on plate 44. The pawls 56 will be in the disengaged position as seen in Figure 1 of the drawings for the reason that L-shaped arms 64 of pawls 56 are in engagement with plate 44 and the V-shaped groove 80 formed in catch 72 will be in an engaging relationship with the same tooth 25 that is engaged in notch 48. This position effectively locks the sprocket 24 and shaft 20 against any rotation. As soon as motor 10 and coil 28 are simultaneously energized the armature assembly 36 is pulled toward the said coil and assumes the position shown in dotted lines in Figure 2 of the drawings. The pawls 56 are no longer held in the disengaged position by virtue of the L-shaped arms resting on plate 44, but are permitted to drop on the shoulder 78 of the projection 76 and are thus effectively kept out of engagement with the teeth 25 of the sprocket. The groove 80 of catch 72 continues to engage the tooth 25 due to the urging of spring 74. Under these conditions rotation of shaft 20 and sprocket 24 is permitted. As the shaft 20 and sprocket 24 are rotated the tooth 25 engaged by groove 80 urges the catch 72 out of engagement. When the catch 72 is forced into chamber 66 a sufficient distance, the face 78 is removed from withunder pawls 56 and they are urged into engagement with the next succeeding tooth 25 under the impetus of springs 60. The position of the pawls 56 on each side of a single tooth effectively locks the sprocket 24 and shaft 20 against further rotation. When the motor 10 and coil 28 are again in a de-energized condition, spring 50 urges the armature assembly 36 toward the full line position shown in Figure 2. Plate 44 engages L-shaped arm 64 which results in lifting pawls 56 from their tooth-engaging position. The tooth 25 engaged by the pawls 56 is engaged by the notch 48 in plate 44. Continued lifting of pawls 56 above the face 78 on projection 76 enables the V-shaped groove 80 of the catch 72 to also engage the tooth 25 engaged by the groove 48. As a result the sprocket is locked against further rotation and a cycle of operation is completed.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An escapement type incremental motion control comprising a rotatable driven assembly having a torque and torque release applied thereto; a pivoted locking assembly actuated by electrical pulses transmitted thereto that engages and disengages the driven assembly to lock and unlock the same to prevent and permit rotation when said locking assembly is de-energized and energized respectively; pivoted mechanism that is engaged by said driven assembly to stop the rotation thereof and that is engaged by said locking assembly, when the latter locks said driven assembly against rotation; to disengage the mechanism from engagement with the driven assembly; and pivoted elements that engage the driven assembly and mechanism to withhold the latter for engagement with the driven assembly until the driven assembly pivots said elements, out of mechanism engagement, and rotates.

2. An escapement type incremental motion control comprising a rotatable driven assembly having torque and torque release applied thereto; a pivotal solenoid coil assembly energized by electrical pulses transmitted thereto; means on said solenoid coil assembly that engages and disengages the driven assembly to lock and unlock the same to prevent and permit rotation when said solenoid coil assembly is de-energized and energized respectively; pivoted mechanism that is engaged by said driven assembly to stop the rotation thereof and that is engaged by said means when the latter locks said driven assembly against rotation, to disengage the mechanism from engagement with the driven assembly; and pivoted element that engage the driven assembly and mechanism to withhold the latter from engagement with the driven assembly until the driven assembly pivots said elements, out of mechanism engagement, and rotates.

3. An escapement type incremental motion control comprising a rotatable driven assembly having a torque and torque release applied thereto; a pivotal locking assembly actuated by electrical pulses transmitted thereto that engages and disengages the driven assembly to lock and unlock the same to prevent and permit rotation when said locking assembly is de-energized and energized respectively; pivotal mechanism that is engaged by said driven assembly to stop the rotation thereof and that is engaged by said locking assembly, when the latter locks said driven assembly against rotation, to disengage the mechanism from engagement with the driven assembly; and pivotal elements that engage the driven assembly and mechanism to withhold the latter from engagement with the driven assembly until the driven assembly pivots said elements, out of mechanism engagement, and rotates; said elements being a cam catch.

4. An escapement type incremental motion control comprising a rotatable driven assembly having a torque and torque release applied thereto; a pivotal locking assembly actuated by electrical pulses transmitted thereto that engages and disengages the driven assembly to lock and unlock the same to prevent and permit rotation when said locking assembly is de-energized and energized respectively; pivotal mechanism that is engaged by said driven assembly to stop the rotation thereof and that is engaged by said locking assembly, when the latter locks said driven assembly against rotation, to disengage the mechanism from engagement with the driven assembly; and pivotal elements that engage the driven assembly and mechanism to withhold the latter from engagement with the driven assembly until the driven assembly pivots said elements, out of mechanism engagement, and rotates; said mechanism being at least one pawl.

5. An escapement type incremental motion control comprising a rotatable driven assembly having a torque and torque release applied thereto; a pivotal locking assembly actuated by electrical pulses transmitted thereto that engages and disengages the driven assembly to lock and unlock the same to prevent and permit rotation when said locking assembly is de-energized and energized respectively; pivotal mechanism that is engaged by said driven assembly to stop the rotation thereof and that is engaged by said locking assembly, when the latter locks said driven assembly against rotation, to disengage the mechanism from engagement with the driven assembly; and pivotal elements that engage the driven assembly and mechanism to withhold the latter from engagement with the driven assembly until the driven assembly pivots said elements, out of mechanism engagement, and rotates; said locking assembly including an armature.

6. An escapement type incremental motion control comprising a rotatable driven assembly having torque and torque release applied thereto; a solenoid coil assembly energized by electrical pulses transmitted thereto; an armature assembly, pivotally secured to said solenoid coil assembly and actuated thereby; structure on said armature assembly that engages and disengages the driven assembly to lock and unlock the same to prevent and permit rotation when said solenoid coil assembly is de-energized and energized respectively; pivotal mechanism that is engaged by said driven assembly to stop the rotation thereof and that is engaged by said structure, when the latter locks said driven assembly against rotation, to disengage the mechanism from engagement with the driven assembly; and pivotal elements that engage the driven assembly and mechanism to withhold the latter from engagement with the driven assembly until the driven assembly pivots said elements, out of mechanism engagement, and rotates.

7. An escapement type incremental motion control comprising a rotatable driven assembly having torque and torque release applied thereto; a solenoid coil assembly energized by electrical pulses transmitted thereto; an armature assembly, pivotally secured to said solenoid coil assembly and actuated thereby; structure on said armature assembly that engages and disengages the driven assembly to lock and unlock the same to prevent and permit rotation when said solenoid coil assembly is de-energized and energized respectively; pivotal mechanism that is engaged by said driven assembly to stop the rotation thereof and that is engaged by said structure, when the latter locks said driven assembly against rotation, to disengage the mechanism from engagement with the driven assembly; and pivotal elements that engage the driven assembly and mechanism to withold the latter from engagement with the driven assembly until the driven assembly pivots said elements, out of mechanism engagement, and rotates; said elements being a cam catch.

8. An escapement type incremental motion control comprising a rotatable driven assembly having torque and torque release applied thereto; a solenoid coil assembly energized by electrical pulses transmitted thereto; an armature assembly, pivotally secured to said solenoid coil assembly and actuated thereby; structure on said armature assembly that engages and disengages the driven assembly to lock and unlock the same to prevent and permit rotation when said solenoid coil assembly is de-energized and energized respectively; pivotal mechanism that is engaged by said driven assembly to stop the rotation thereof and that is engaged by said structure, when the latter locks said driven assembly against rotation, to disengage the mechanism from engagement with the driven assembly; and pivotal elements that engage the driven assembly and mechanism to withhold the latter from engagement with the driven assembly until the driven assembly pivots said elements, out of mechanism engagement, and rotates; said mechanism being at least one pawl.

9. An escapement type incremental motion control comprising a rotatable driven assembly having torque and torque release applied thereto; a solenoid coil assembly energized by electrical pulses transmitted thereto; an armature assembly, pivotally secured to said solenoid coil assembly and actuated thereby; structure on said armature assembly that engages and disengages the driven assembly to lock and unlock the same to prevent and permit rotation when said solenoid coil assembly is de-energized and energized respectively; pivotal mechanism that is engaged by said driven assembly to stop the rotation thereof and that is engaged by said structure, when the latter locks said driven assembly against rotation, to disengage the mechanism from engagement with the driven assembly; and pivotal elements that engage the driven assembly and mechanism to withhold the latter from engagement with the driven assembly until the driven assembly pivots said elements, out of mechanism engagement, and rotates; said structure being a notched plate secured to said armature.

10. An escapement type incremental motion control comprising a rotatable shaft having torque and torque release applied thereto; a sprocket wheel secured to said shaft; a plurality of teeth on said sprocket wheel; a pivotal locking assembly actuated by electrical pulses transmitted thereto that engages and disengages one tooth of said sprocket wheel to lock and unlock the same to prevent and permit rotation of said shaft when said locking assembly is de-energized and energized respectively; pivotal mechanism that is engaged by said teeth of said sprocket wheel to stop the rotation of said shaft and that is engaged by said locking assembly, when the latter locks said shaft against rotation, to disengage the mechanism from engagement with said teeth; and pivotal elements that engage said teeth and mechanism to withhold the latter from engagement with said teeth until the teeth pivot said elements out of mechanism engagement, and the shaft, sprocket and teeth rotate.

11. An escapement type incremental motion control comprising a rotatable shaft having torque and torque release applied thereto; a sprocket wheel secured to said shaft; a plurality of teeth on said sprocket wheel; a pivotal locking assembly actuated by electrical pulses transmitted thereto that engages and disengages one tooth of said sprocket wheel to lock and unlock the same to prevent and permit rotation of said shaft when said locking assembly is de-energized and energized respectively; pivotal mechanism that is engaged by said teeth of said sprocket wheel to stop the rotation of said shaft and that is engaged by said locking assembly, when the latter locks said shaft against rotation, to disengage the mechanism from engagement with said teeth; and pivotal elements that engage said teeth and mechanism to withhold the latter from engagement with said teeth until the teeth pivot said elements out of mechanism engagement, and the shaft, sprocket and teeth rotate; said locking assembly including an armature.

12. An escapement type incremental motion control comprising a rotatable shaft having torque and torque release applied thereto; a sprocket wheel secured to said shaft; a plurality of teeth on said sprocket wheel; a pivotal locking assembly actuated by electrical pulses transmitted thereto that engages and disengages one tooth of said sprocket wheel to lock and unlock the same to prevent and permit rotation of said shaft when said locking assembly is de-energized and energized respectively; pivotal mechanism that is engaged by said teeth of said sprocket wheel to stop the rotation of said shaft and that is engaged by said locking assembly, when the latter locks said shaft against rotation, to disengage the mechanism from engagement with said teeth; and pivotal elements that engage said teeth and mechanism to withhold the latter from engagement with said teeth until the teeth pivot said elements out of mechanism engagement, and the shaft, sprocket and teeth rotate; said mechanism being at least one pawl.

13. An escapement type incremental motion control comprising a rotatable shaft having torque and torque release applied thereto; a sprocket wheel secured to said shaft; a plurality of teeth on said sprocket wheel; a pivotal locking assembly actuated by electrical pulses transmitted thereto that engages and disengages one tooth of said sprocket wheel to lock and unlock the same to prevent and permit rotation of said shaft when said locking assembly is de-energized and energized respectively; pivotal mechanism that is engaged by said teeth of said sprocket wheel to stop the rotation of said shaft and that is engaged by said locking assembly, when the latter locks said shaft against rotation, to disengage the mechanism from engagement with said teeth; and pivotal elements that engage said teeth and mechanism to withhold the latter from engagement with said teeth until the teeth pivot said elements out of mechanism engagement, and the shaft, sprocket and teeth rotate; said elements being a cam catch.

References Cited in the file of this patent
UNITED STATES PATENTS
1,301,050    Hagman _____ Apr. 15, 1919